(12) United States Patent
Baldauf et al.

(10) Patent No.: US 8,022,340 B2
(45) Date of Patent: Sep. 20, 2011

(54) ATTACHING UNIT AND KNOB FOR A HEATING UNIT OF A CIGAR LIGHTER

(75) Inventors: Albert Baldauf, Hanau (DE); Ronald Schwarzbach, Frankfurt (DE); Norbert Graeser, Frankfurt (DE)

(73) Assignee: Casco Schoeller GmbH (DE)

( * ) Notice: Subject to any disclaimer, the term of this patent is extended or adjusted under 35 U.S.C. 154(b) by 453 days.

(21) Appl. No.: 11/815,061

(22) PCT Filed: Dec. 9, 2005

(86) PCT No.: PCT/EP2005/013190
§ 371 (c)(1),
(2), (4) Date: Mar. 24, 2008

(87) PCT Pub. No.: WO2006/081859
PCT Pub. Date: Aug. 10, 2006

(65) Prior Publication Data
US 2008/0203086 A1 Aug. 28, 2008

(30) Foreign Application Priority Data
Feb. 2, 2005 (DE) .......................... 10 2005 004 724

(51) Int. Cl.
*H05B 3/02* (2006.01)
(52) U.S. Cl. ...................................... 219/538; 219/202
(58) Field of Classification Search .................. 338/230, 338/232, 233, 243; 219/202, 532–537, 541, 219/546–548
See application file for complete search history.

(56) References Cited

U.S. PATENT DOCUMENTS

| | | | | |
|---|---|---|---|---|
| 1,522,992 | A * | 1/1925 | Abbott | 219/538 |
| 4,692,590 | A * | 9/1987 | Spector | 392/390 |
| 6,414,272 | B2 * | 7/2002 | Rostan | 219/267 |
| 7,145,103 | B2 * | 12/2006 | Sheen | 219/269 |
| 7,193,182 | B2 * | 3/2007 | Can et al. | 219/267 |
| 2003/0209531 | A1 * | 11/2003 | Mattis | 219/265 |

FOREIGN PATENT DOCUMENTS

| | | |
|---|---|---|
| DE | 44 03 680 | 8/1994 |
| EP | 0 776 785 | 6/1997 |
| GB | 2 038 466 | 7/1980 |

OTHER PUBLICATIONS

Machine Translation of DE4403680.*

(Continued)

*Primary Examiner* — Geoffrey S Evans
*Assistant Examiner* — Mark Woodall
(74) *Attorney, Agent, or Firm* — Ostrolenk Faber LLP

(57) ABSTRACT

The invention relates to a unit for fixing a base body provided with a housing of a cigar lighter heating element, in particular for motor vehicles. The inventive fixing unit is used for fixing a button actuating said heating element. Said fixing unit comprises a fixing element fixable to the housing of the base body of the heating element and an adapter for fixing the button, wherein said adapter is adjustably inserted into the fixing element and is guided in such a way that it is axially displaceable with respect thereto. The fixing unit makes it possible to mount the button only at a last operation for assembling said heating element, thereby enabling the button, which is embodied in the form of a decorative element, not to be exposed to mechanical stresses produced during an assembling process and to prevent the button damage by assembling operations.

18 Claims, 3 Drawing Sheets

OTHER PUBLICATIONS

PCT International Search Report dated Mar. 30, 2006 issued in corresponding PCT International Patent Application PCT/EP2005/013190.

PCT International Preliminary Report on Patentability dated Sep. 27, 2007 issued in corresponding PCT International Patent Application PCT/EP2005/013190.

* cited by examiner

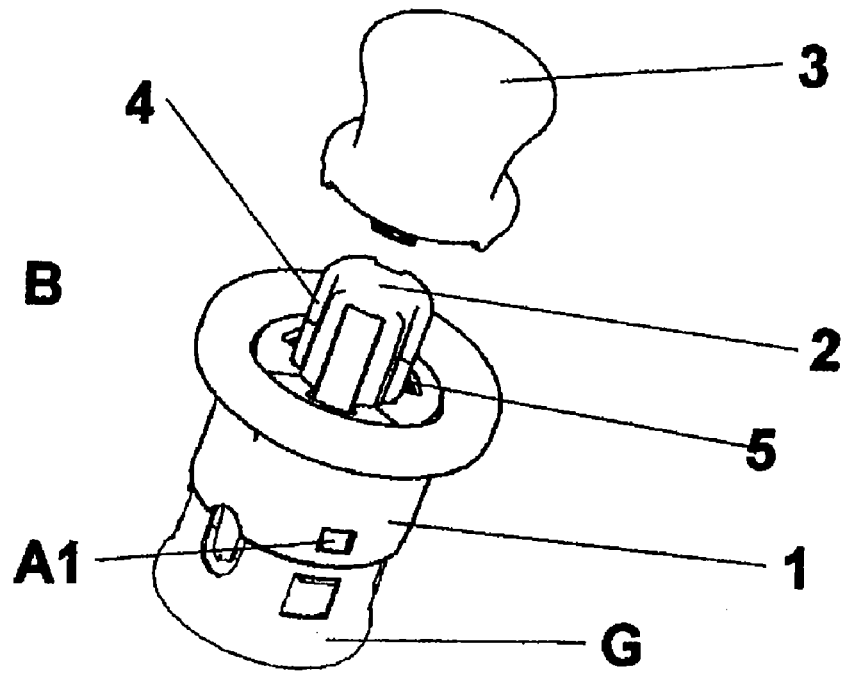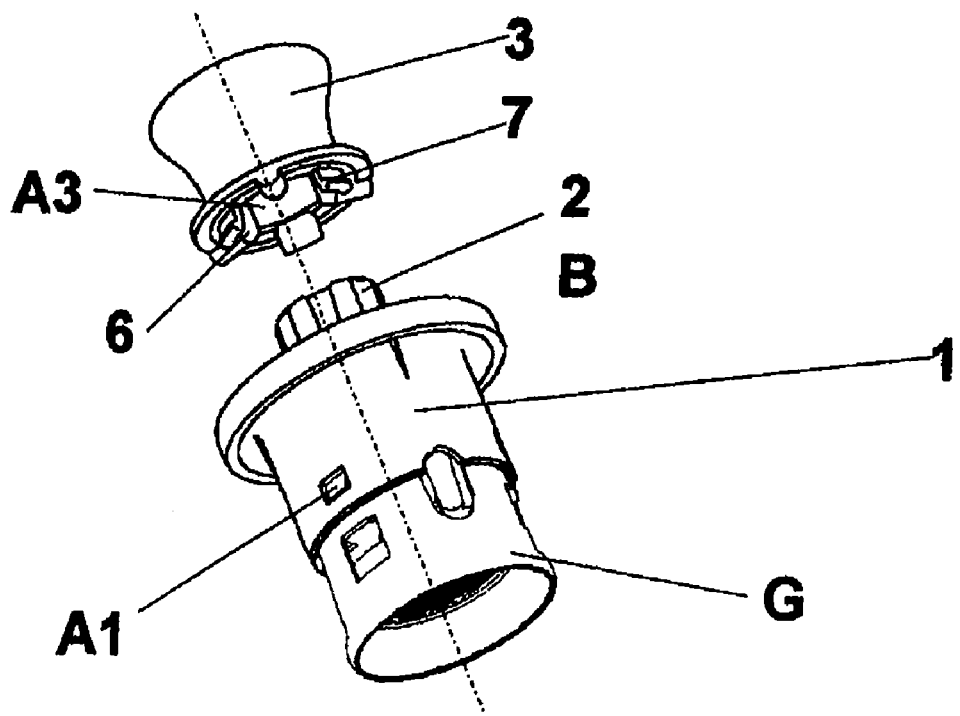
Figur 1

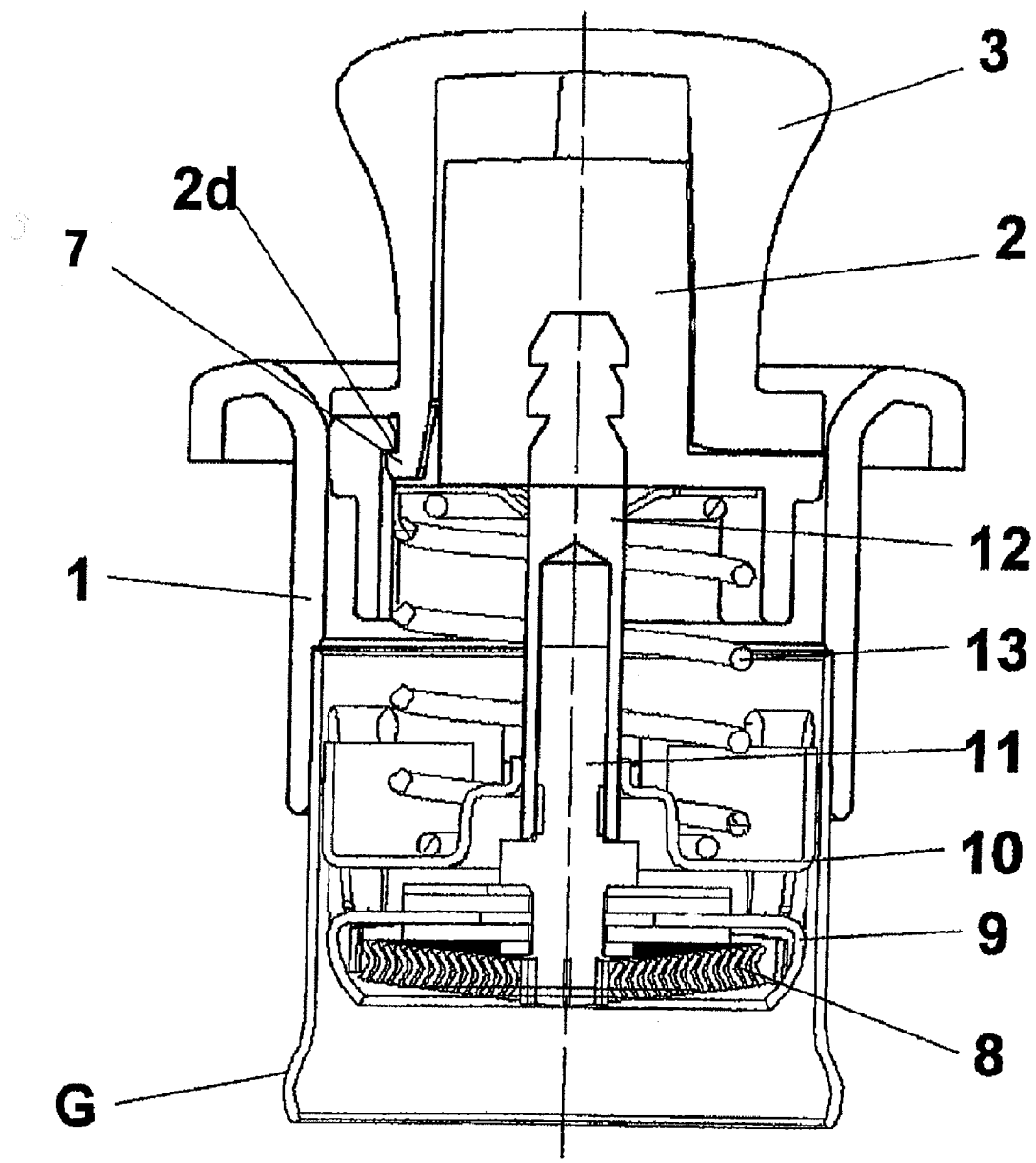
Figur 2

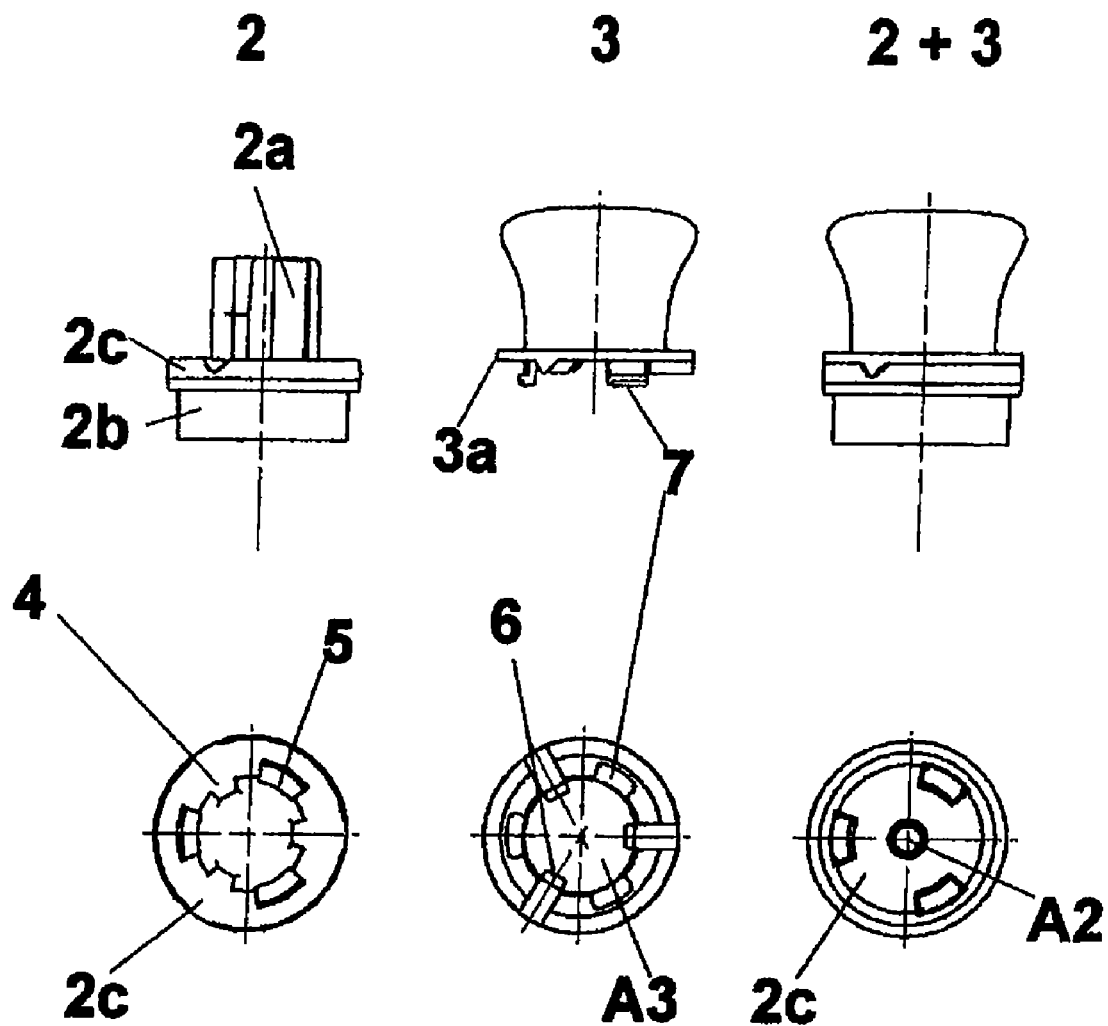
Figur 3

ATTACHING UNIT AND KNOB FOR A HEATING UNIT OF A CIGAR LIGHTER

CROSS REFERENCE TO RELATED APPLICATION

The present application is a 35 U.S.C. §§371 national phase conversion of PCT/EP2005/013190, filed Dec. 9, 2005, which claims priority of German Application No. 10 2005 004 724.6, filed Feb. 2, 2005, the disclosure of which has been incorporated herein by reference. The PCT International Application was published in the German language.

FIELD OF THE INVENTION

The present invention relates to an attaching unit for a main body of a heating unit, which heating unit is part of an electric cigar lighter, in particular for motor vehicles. The attaching unit according to the invention is used to attach a knob for actuating the heating unit of the cigar lighter. The present invention also relates to a knob of this kind for attachment to the attaching unit.

BACKGROUND OF THE INVENTION

Basically, conventional electric cigar lighters which are used in motor vehicles have a socket, in the form of an electrically conductive sleeve, and a heating unit which is arranged in the socket to be withdrawable. A cigar lighter of this kind is installed in a fixed wall, such for example as in the dashboard or the centre console of a motor vehicle, and is connected to the motor vehicle's electrical system by means of connecting members.

To actuate the heating unit, use is made of a knob which, if of a design specific to the carmaker involving a particular shape for the knob combined with a particular logo, can make a contribution to the styling of the interior trim of a private car. Conventional heating units are so constructed that the knob cannot be exchanged once the heating unit has been assembled. This being so, it is important for the knob not to be damaged when the heating unit is assembled. If there is any damage to the knob, a heating unit of this kind, which is also a relatively expensive product to manufacture, has to be discarded as scrap.

The assembly of a heating unit of this kind takes place in a plurality of operations, it being known that, starting with the knob, all the parts of the heating unit have to be fitted in sequence in this case.

Mechanical stresses occur during the assembly of the heating unit and because the knob is exposed to these right from the outset, the possibility of damage to the knob in the course of assembly cannot be ruled out. It is therefore difficult for a high standard of quality to be achieved.

The object underlying the invention is therefore to improve the standard of quality in the assembly of heating units of this kind in order thereby to prevent scrap.

This object is achieved in accordance with the invention by virtue of the features described herein.

SUMMARY OF THE INVENTION

The attaching unit according to the invention for a main body of a heating unit, which heating unit is part of an electric cigar lighter, is used to attach a knob according to the invention by which the heating unit is actuated. In accordance with the invention, the attaching unit comprises an attaching element which can be attached to the housing of the main body of the heating unit, and an adapter for attaching the knob according to the invention, the adapter being inserted in the attaching element as an exact fit and being guided to be displaceable axially relative thereto. The knob according to the invention for attachment to the attaching unit is of a form such that it can be fitted onto the attaching unit and attached thereto.

In a preferred embodiment of the invention, the attaching element is in one piece and is formed to be substantially symmetrical in rotation and for attachment to the housing of the main body it comprises cut-outs for latching means to latch into. The attaching element is preferably provided with two diametrically opposed cut-outs. Alternatively, the attaching element may also be of a box-like form.

To form a collar, the attaching element is curved over around its entire circumference at the knob end, preferably in a lip-like form. When the heating unit is in the inserted state in a socket installed in a fixed wall, this collar rests against the fixed wall. Alternatively, the collar may also be in the form of an annular disc. Usefully, the adapter, which is inserted in the attaching element as an exact fit, is in one piece and is formed to be symmetrical in rotation, in which case the adapter may be of different diameters.

In a further preferred embodiment of the invention, the adapter takes the form, at the knob end, of a substantially cylindrical spigot or post for receiving the knob.

The knob for fitting on to the post is usefully in one piece and is formed to be substantially symmetrical in rotation. Also, the knob is usefully in the form of a hollow body having a substantially cylindrical recess.

In a further preferred embodiment of the invention, to receive the knob, the post of the adapter is advantageously provided with at least one groove in the axial direction. The post preferably has three grooves in the axial direction which are arranged at 120° to one another.

The recess in the knob usefully has at least one spline in the axial direction for insertion in the at least one groove in the adapter. The recess is preferably provided with three splines which are arranged at 120° to one another.

The knob can preferably be attached to the attaching unit by latching or snapping into it. This being the case, the knob may have, at the adapter end, a plane contacting face from which means for attaching to the attaching unit, such as at least one latching nose, may start.

The knob is preferably provided with three latching noses which are arranged at 120° to one another.

For attachment to the main body of the heating unit, the adapter may be in the form of a ring at the opposite end from the spigot, there being a partition, which is provided with at least one cut-out in the radial direction for attaching the knob, situated between the post and the ring. The partition is preferably provided with three cut-outs which are arranged at 120° to one another. The part of the adaptor which is in the form of a ring enables a return spring to be received, which return spring is in the form of a coil spring which is part of the main body of the heating unit.

The adapter may also have at the ring end a central recess to receive a connecting pin, which connecting pin is likewise part of the main body of the heating unit.

Both the attaching element and the adapter are preferably in the form of injection mouldings of plastics material, what may be considered as a plastics material advantageously being a heat-resistant thermoplastic material.

The knob too is preferably in the form of an injection moulding of plastics material, in which case, similarly to the attaching element, what may be considered as a plastics material is advantageously a heat-resistant thermoplastic material.

The standard of quality in the assembly of the heating unit is improved by the attaching unit according to the invention, because, unlike conventional knobs, it is possible for the knob according to the invention to be fitted only in the final operation of the assembly process. As an element of trim, this prevents the knob from being exposed to the mechanical stresses which occur in the course of assembly. This being the case, the possibility of damage to the knob during the individual operations in the course of assembly is ruled out.

In what follows, an embodiment of the invention will be explained in detail by reference to the drawings. In the drawings:

BRIEF DESCRIPTION OF DRAWINGS

FIG. 1 shows two exploded views of a heating unit which is part of an electric cigar lighter and which has an attaching unit according to the invention and a knob according to the invention, FIG. 2 is a view of the heating unit in section to show an attaching element and an adapter of the attaching unit according to the invention, the knob according to the invention being attached to the adapter, and FIG. 3 is a view of the adapter, the knob, and the adapter with the knob attached to it.

DESCRIPTION OF THE PREFERRED EMBODIMENTS OF THE INVENTION

FIG. 1 shows two exploded views of a heating unit H which is part of an electric cigar lighter for motor vehicles. The cigar lighter is a component which basically comprises a socket in the form of an electrically conductive sleeve (not shown here) and the heating unit H, which is arranged in the socket to be withdrawable. The cigar lighter is installed in a fixed wall, such for example as in the dashboard or the centre console of a motor vehicle. The cigar lighter is connected to the electrical system of the motor vehicle by means of connecting members.

The socket in sleeve form has, to receive the heating unit H, an open end which is provided with a collar which comes to bear against the front face of the fixed wall. At the opposite end from the open end, the socket in sleeve form has an end-wall which carries a U-shaped bimetallic strip having two axially orientated blades which are each provided with a retaining nose, the retaining noses being directed towards one another.

The bimetallic strip is intended to be electrically connected by means of a connecting member to a positive terminal, whereas the sleeve is connected to a negative terminal (earth). Two retaining tongues, which are produced in the socket in sleeve form in the form of U-shaped slots and which are arranged to be diametrically opposed, hold the heating unit H arranged in the interior in position and at the same time bring it into contact with the electrically conductive sleeve.

The heating unit H shown in FIG. 1 comprises a substantially cylindrical main body which has a housing G. This main body is connected to an attaching unit B according to the invention for attaching a knob 3 according to the invention, which is used to actuate the said heating unit H.

The attaching unit B according to the invention comprises a one-piece attaching element 1, which is substantially symmetrical in rotation and which is attached to the housing G of the main body by latching into it, and a one-piece adapter 2 which is substantially symmetrical in rotation and which is inserted in the attaching element 1 as an exact fit and which is guided to be axially displaceable relative to this latter. The knob 3 according to the invention is in one piece and is formed to be substantially symmetrical in rotation and is attached to the adapter 2 by latching into it.

The latched connection between the housing G of the main body and the attaching element 1 is made by means of three rectangular cut-outs A1 which are made in the attaching element 1 at angles of 120°, there being latching tongues, so-called snap-ins, which engage in the cut-outs A1. To form a collar which rests against the fixed wall when the heating unit H is in the installed state, the attaching element 1 is curved over in the form of a lip around the whole of its circumference at the knob end.

In FIG. 2, the heating unit is shown in a view in section to show the attaching element 1 and adapter 2 of the attaching unit B according to the invention, and the knob 3 according to the invention.

Basically, the heating unit H is in two parts, a part which is arranged in a fixed position in the socket in sleeve form and a part which is movable axially relative to this latter part. The former is composed of the attaching element 1 and the housing G of the main body, whereas the latter comprises all the other parts of the heating unit H.

The main body of the heating unit H constitutes a standard structure and comprises a heating element 8 which is arranged in the interior of a cup 9, a guide 10, a shaft 11, a connecting pin 12 for attaching the main body to the adapter 2, the shaft 11 being gripped to the connecting pin 12, and a return spring, in the form of a coil spring 13, which is arranged between the adapter 2 and the guide 10.

A structure of this kind for the main body is generally familiar to the person skilled in the art from the prior art.

In its normal position, the movable part of the heating unit H, or rather the cup 9 in which heating element 8 is situated, is arranged at a distance from the blades of the bimetallic strip, which means that there is no flow of current between the bimetallic strip and the electrically conductive socket in sleeve form. To heat the heating element 8, the movable part of the heating unit H, or rather the cup 9 of the heating element 8, is pressed from its normal position into the heating position by means of the knob 3, the return spring 13 being compressed when this is down. As the movable part moves forward in the axial direction, the cup 9 spreads the blades of the bimetallic strip, which is produced in a U-shape, apart, whereupon the cup 9 makes its way under the retaining noses on the said blades, which retaining noses hold the cup 9 in the pressed-in position in opposition to the action of the return spring 13. The cup 9 performs the function of an electrical switch and its latching into place produces a flow of current between the bimetallic strip and the electrically conductive socket in sleeve form. When this happens the heating element 8 heats up due to its resistance. Because of the heating up of the heating element 8, the blades of the bimetallic strip, which are resting against the cup 9 of the heating element, expand outwards. To enable the blades to expand outwards under the prompting of the heat generated, the sleeve of the socket has lateral openings through which the blades are able to spread open. At a given temperature, the return spring 13 performs its function, thus enabling the cup 9 of the heating element 8 to detach from the bimetallic strip in order to assume an exited position and interrupt the flow of current. A driver or front-seat passenger then simply has to withdraw the heating unit H in order to light a cigarette or cigar.

Shown in the row at the top of FIG. 3 are, reading from left to right, views of the adapter 2, the knob 3, and the adapter 2 with the knob 3 attached to it, whereas in the row at the bottom of FIG. 3 are shown, reading from left to right, a plan view of the adapter 2 and views from below of the knob 3 and of the adapter 2 with the knob 3 attached to it.

Referring to the adapter 2, it can be seen that it has sections of different diameters. At the knob end, the adapter 2 has a substantially cylindrical spigot or post 2a, whereas at the opposite end from the post 2a it is in the form of a ring 2b, a partition 2c being situated between the post 2a and the ring 2b. To receive the knob 3, the post 2a is provided in the axial direction with three grooves 4 which are arranged at 120° to one another. To allow the knob 3 to be attached, the partition 2c of the adapter 2 has three rectangular cut-outs 5 in the radial direction, which are arranged at 120° to one another. To receive the connecting pin 12 of the main body, the adapter 2 has, at the ring end, a central recess A2 which can be seen in the bottom exploded view in FIG. 1.

At the adapter end, the knob 3 has a plane contacting face 3a from which start three latching noses 7 which, as attaching means, engage in the cut-outs 5 in the adapter 2, the said three latching noses 7 being arranged at 120° to one another. If the view of the knob 3 from below is referred to, it can be seen that it takes the form of a hollow body having a recess A3 for fitting onto the post 2a. Inside this substantially cylindrical recess A3, the knob 3 has three splines 6 for insertion in the three grooves 4 in the adapter 2, the splines 6 being arranged at 120° to another to match the grooves 4.

In the view in section in FIG. 2, it can be seen that the knob 3 is connected to the adapter 2 of the attaching unit B by latching into it. When the knob 3 is in the latched-in state, the latching noses 7 extend through the cut-outs 5 in the partition 2c and fit behind an inwardly projecting shoulder 2d which extends round in a circle on the adapter 2. In the view from below of the adapter 2 with the knob 3 attached to it, the latching noses 7 can be seen in the latched-in state.

Both the attaching element 1 and the adapter 2 of the attaching unit according to the invention and also the knob 3 according to the invention are in the form of injection mouldings of plastics material, the plastics material being a heat-resistant thermoplastic material.

The invention claimed is:

1. Attaching unit for a main body of a cigar lighter, the main body having a housing for a heating unit, the attaching unit provided for attaching a knob used to actuate the heating unit to the main body, the attaching unit comprising:
    an attaching element which can be attached to the housing of the main body;
    the main body having a connecting element;
    an adapter for attaching the knob to the main body, the adapter being inserted in the attaching element as a slidable fit in the attaching element and being guided to be displaceable axially relative to the attaching element, the adapter having a recess that receives the connecting element to secure the adapter to the connecting element,
    the adapter comprising a post for receiving a hollow recess of the knob, a ring opposite the post, and a partition between the post and the ring
    the partition having an outer diameter greater than the outer diameter of the post and the ring, the partition outer diameter being sized to form the slidable fit in the attaching element to allow the adapter to be guided axially in the attaching element to actuate the heating unit;
    the partition having a plurality of cut-outs in a radial direction for attaching the knob, the knob having a plurality of downwardly and radially directed latching noses for latching into the cut-outs with a snap-fit, the knob having a plane contacting face that is received against the partition so as to seat the knob thereon; and
    whereby the hollow recess of the knob can be fitted to the post as a final assembly operation thereby to minimize damage to the knob during the assembly operation.

2. Attaching unit according to claim 1, characterised in that the attaching element for attaching to the housing of the main body has at least one cut-out for latching onto the main body.

3. Attaching unit according to claim 1, characterised in that the attaching element is curved over around a circumference thereof in a lip shapedform at an end thereof adjacent where the knob attaches to the post.

4. Attaching unit according to claim 1, characterised in that the attaching element is in one piece and is formed to be substantially symmetrical in rotation.

5. Attaching unit according to claim 1, characterised in that the adapter is in one piece and is formed to be substantially symmetrical in rotation.

6. Attaching unit according to claim 5, characterised in that the post, partition and ring of the adapter are of different outer diameters.

7. Attaching unit according to claim 6, characterised in that the post is substantially cylindrical.

8. Attaching unit according to claim 7, characterised in that the post is provided with at least one groove in the axial direction to receive the hollow recess of the knob.

9. Attaching unit according to claim 1, characterised in that both the attaching element and the adapter comprise injection mouldings of plastics material.

10. Attaching unit according to claim 9, characterised in that the plastics material of the injection mouldings is a thermoplastic material.

11. The attaching unit according to claim 1, wherein the connecting element comprises a central connecting pin and the recess of the adapter comprises a central recess.

12. A knob and attaching unit, the knob for attachment to an the attaching unit of a main body of a cigar lighter, the main body having a housing for a heating unit, the knob being used to actuate the heating unit, the attaching unit comprising:
    an attaching element which can be attached to the housing of the main body;
    the main body having a connecting element;
    an adapter for attaching the knob to the main body, the adapter being inserted in the attaching element as a slidable fit in the attaching element and being guided to be displaceable axially relative to the attaching element, the adapter having a recess that receives the connecting element to secure the adapter to the connecting element,
    the adapter comprising a post for receiving a hollow recess of the knob, a ring opposite the post, and a partition between the post and the ring;
    the partition having an outer diameter greater than an outer diameter of the post and the ring, the partition outer diameter being sized to form the slidable fit in the attaching element to allow the adapter to be guided axially in the attaching element to actuate the heating unit;
    the partition having a plurality of cut-outs in a radial direction for attaching the knob, the knob having a plurality of downwardly and radially directed latching noses for latching into the cut-outs with a snap-fit, the knob having a plane contacting face that is received against the partition so as to seat the knob thereon; and
    whereby the hollow recess of the knob can be fitted to the post as a final assembly operation thereby to minimize damage to the knob during the assembly operation.

13. The knob and attaching unit according to claim 12, characterised in that the knob is in one piece and is formed to be substantially symmetrical in rotation.

14. The knob and attaching unit according to claim 12, characterised in that the knob is in the form of a hollow body having a recess for fitting onto the post of the adapter.

15. The knob and attaching unit according to claim 14, characterised in that the recess of the knob is substantially cylindrical.

16. The knob and attaching unit according to claim 15, characterised in that the recess of the knob has at least one spline in an axial direction of the knob for insertion in at least one groove of the post.

17. The knob and attaching unit according to claim 12, characterised in that the knob comprises an injection moulding plastics material.

18. The knob and attaching unit according to claim 17, characterised in that the plastics material of the knob is a thermoplastic material.

* * * * *